(12) United States Patent
Minikey, Jr. et al.

(10) Patent No.: US 10,971,830 B2
(45) Date of Patent: *Apr. 6, 2021

(54) LOW PROFILE CONNECTOR WITH SPRING CONTACTS

(71) Applicant: Gentex Corporation, Zeeland, MI (US)

(72) Inventors: Danny L. Minikey, Jr., Fenwick, MI (US); Eric S. Lundy, Grand Rapids, MI (US); Christopher D. Pollack, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/692,870

(22) Filed: Nov. 22, 2019

(65) Prior Publication Data

US 2020/0091627 A1    Mar. 19, 2020

Related U.S. Application Data

(62) Division of application No. 15/983,166, filed on May 18, 2018, now Pat. No. 10,490,914.

(Continued)

(51) Int. Cl.
| | |
|---|---|
| *H01R 4/48* | (2006.01) |
| *H01R 4/18* | (2006.01) |
| *B60R 1/08* | (2006.01) |
| *B60R 1/04* | (2006.01) |
| *H01R 12/75* | (2011.01) |
| *H01R 12/71* | (2011.01) |
| *H01R 13/24* | (2006.01) |

(52) U.S. Cl.
CPC .............. *H01R 4/48* (2013.01); *B60R 1/04* (2013.01); *B60R 1/088* (2013.01); *H01R 4/185* (2013.01); *H01R 12/716* (2013.01); *H01R 12/75* (2013.01); *H01R 13/24* (2013.01)

(58) Field of Classification Search
CPC ............... H01R 13/6658; H01R 13/24; H01R 2103/00; H01R 24/28; H01R 23/025; H01R 4/48; H01R 4/185; H01R 12/716; H01R 12/75; B60Q 1/26; B60R 1/088; B60R 1/04
USPC ................................ 439/76.1, 694; 362/494
See application file for complete search history.

(56) References Cited

U.S. PATENT DOCUMENTS

| | | |
|---|---|---|
| 2,414,223 A | 1/1947 | De Virgilis |
| 4,443,057 A | 4/1984 | Bauer et al. |

(Continued)

FOREIGN PATENT DOCUMENTS

| | | |
|---|---|---|
| EP | 0734100 A2 | 9/1996 |
| WO | 2004103773 A3 | 12/2004 |

*Primary Examiner* — Gary F Paumen
(74) *Attorney, Agent, or Firm* — Price Heneveld LLP; Bradley D. Johnson

(57) ABSTRACT

A rearview device includes a connector assembly that has a body that includes a plurality of electrical leads that extend therefrom and are removably coupled therewith. A plurality of contact-receiving apertures extend through the body and receive a plurality of spring contacts on a circuit board. The plurality of spring contacts abut and are compressed between the circuit board and the body. The plurality of spring contacts directly engage the plurality of electrical leads when inserted into the plurality of contact-receiving apertures. A plurality of peripheral walls are adjacent the circuit board.

18 Claims, 18 Drawing Sheets

Related U.S. Application Data

(60) Provisional application No. 62/508,633, filed on May 19, 2017.

(56) References Cited

U.S. PATENT DOCUMENTS

| | | | |
|---|---|---|---|
| 4,646,210 | A | 2/1987 | Skogler et al. |
| 5,455,716 | A | 10/1995 | Suman et al. |
| 6,170,956 | B1 | 1/2001 | Rumsey et al. |
| 6,239,899 | B1 | 5/2001 | DeVries et al. |
| 6,428,172 | B1 | 8/2002 | Hutzel et al. |
| 7,266,204 | B2 | 9/2007 | Matson et al. |
| 7,746,535 | B2 | 6/2010 | Kelley et al. |
| 7,845,968 | B1 | 12/2010 | Huss, Jr. et al. |
| 10,490,914 | B2 * | 11/2019 | Minikey, Jr. ......... H01R 12/716 |
| 2002/0191409 | A1 | 12/2002 | DeLine et al. |
| 2005/0174663 | A1 | 8/2005 | Carter et al. |
| 2006/0084318 | A1 | 4/2006 | Si et al. |
| 2011/0053435 | A1 | 3/2011 | Wavering |

* cited by examiner

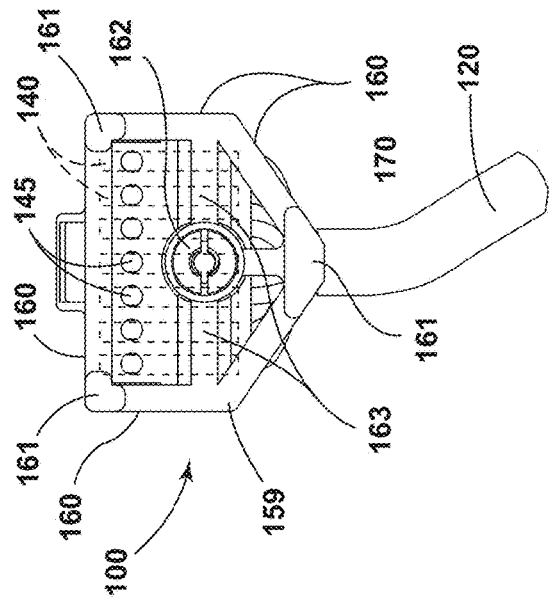
FIG. 22
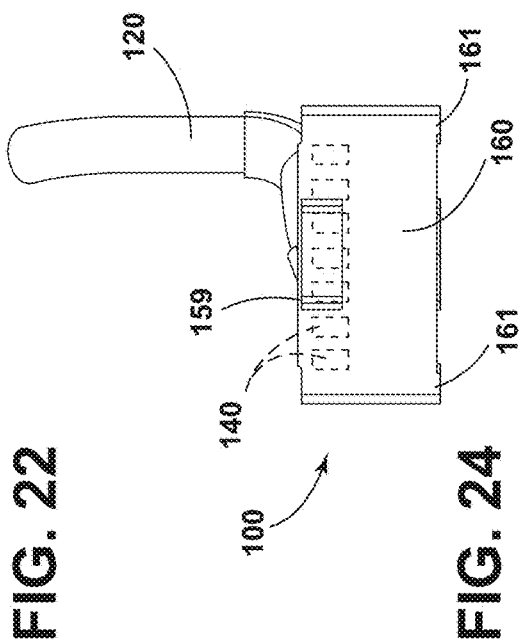
FIG. 24
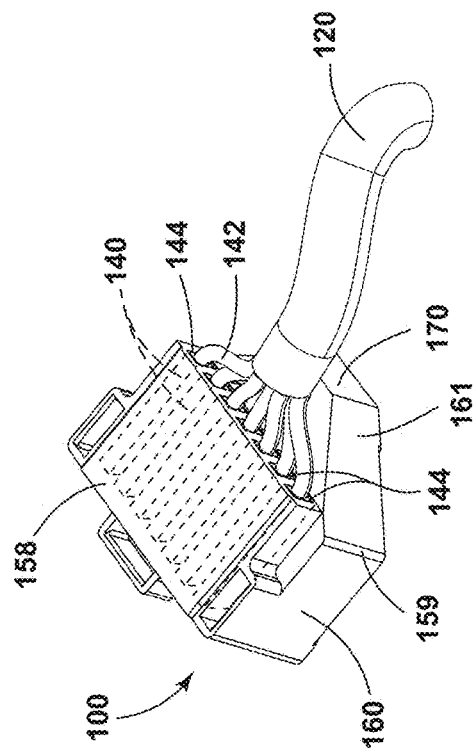
FIG. 21
FIG. 23

LOW PROFILE CONNECTOR WITH SPRING CONTACTS

CROSS-REFERENCE TO RELATED APPLICATION

This application is a divisional of U.S. patent application Ser. No. 15/983,166, filed on May 18, 2018, now U.S. Pat. No. 10,490,914, entitled "LOW PROFILE CONNECTOR WITH SPRING CONTACTS," which claims priority to and the benefit under 35 U.S.C. § 119(e) of U.S. Provisional Application No. 62/508,633, filed on May 19, 2017, entitled "LOW PROFILE CONNECTOR WITH SPRING CONTACTS," the disclosures of which are hereby incorporated herein by reference in their entirety.

TECHNOLOGICAL FIELD

The present invention generally relates to a connector assembly, and more particularly, to a low profile connector with spring contacts for a connector assembly.

SUMMARY OF THE DISCLOSURE

In one aspect of the present disclosure, a rearview device includes a connector assembly that has a body that includes a plurality of electrical leads that extend therefrom and are removably coupled therewith. A plurality of contact-receiving apertures extend through the body and receive a plurality of spring contacts on a circuit board. The plurality of spring contacts abut and are compressed between the circuit board and the body. The plurality of spring contacts directly engage the plurality of electrical leads when inserted into the plurality of contact receiving apertures. A plurality of peripheral walls are adjacent the circuit board.

In another aspect of the present disclosure, a rearview device includes a housing that has a support structure operably coupled to a rear wall of the housing. A connector assembly includes a body engaged with the support structure that has a plurality of electrical leads that extend therefrom. A plurality of contact-receiving apertures extend through the body and receive a plurality of spring contacts on a circuit board. The plurality of spring contacts directly engage the plurality of electrical leads when inserted into the plurality of contact-receiving apertures. A plurality of peripheral walls are adjacent the circuit board.

These and other features, advantages, and objects of the present invention will be further understood and appreciated by those skilled in the art by reference to the following specification, claims, and appended drawings.

BRIEF DESCRIPTION OF THE DRAWINGS

In the drawings:

FIG. 21 is a top perspective view of a connector assembly of the present disclosure;

FIG. 22 is a bottom plan view of the connector assembly of FIG. 21;

FIG. 23 is a bottom perspective view of the connector assembly of FIG. 21;

FIG. 24 is a side elevational view of the connector assembly of FIG. 21; and

DETAILED DESCRIPTION

Figure 1A:
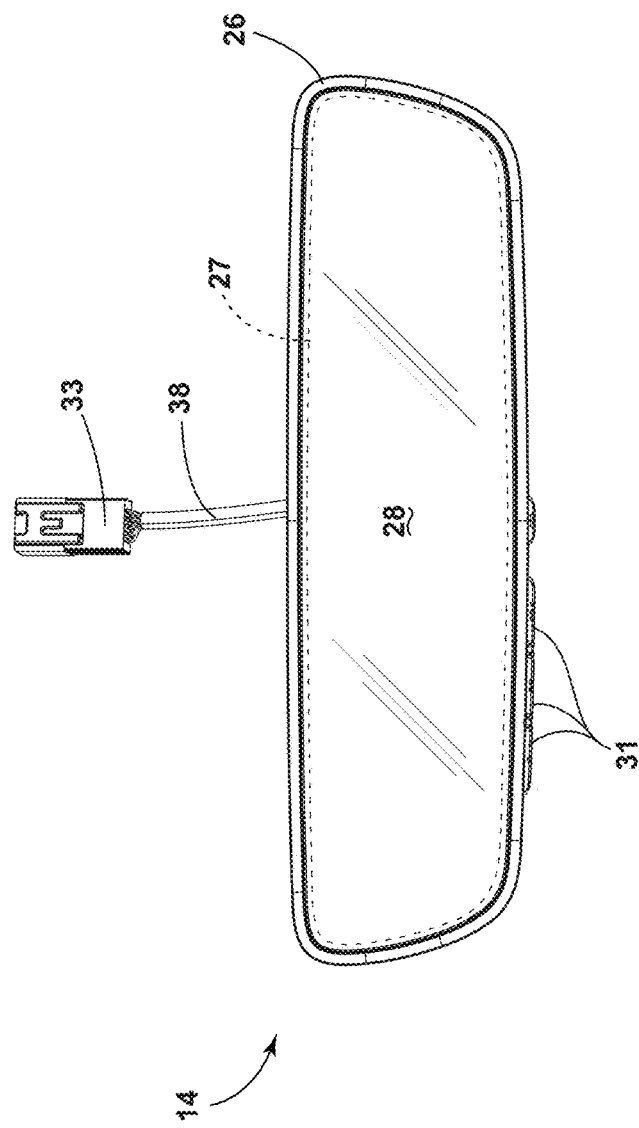
FIG. 1A is a front elevational view of a mirror assembly of the present disclosure with a glass element in front of a circuit board.

The present illustrated embodiments reside primarily in combinations of method steps and apparatus components of the low-profile connector with spring contacts. The apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the invention as oriented in FIG. 1A. Unless stated otherwise, the term "front" shall refer to the surface of the device closer to an intended viewer of the device, and the term "rear" shall refer to the surface of the device further from the intended viewer of the device. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1A-12, reference numeral 10 generally designates a connector assembly that is operably coupled with a circuit board 12 for a rearview device 14. The connector assembly 10 (FIGS. 3 and 6) includes a body 16 having a plurality of wire or electrical leads 18 extending therefrom. A plurality of contact-receiving apertures 20 are defined through the body 16. A plurality of spring-biased contacts 22 extend into the contact-receiving apertures 20 and are guided by a plurality of columns 24. The plurality of spring-biased contacts 22 are in electrical communication with the plurality of electrical leads 18 when inserted into the contact-receiving apertures 20 of the body 16.

With reference again to FIGS. 1A and 1B, the illustrated connector assembly 10 is configured for use within the rearview device 14, but it will be understood that the connector assembly 10 could be used with a variety of other products. The rearview device 14 may include a bezel 26, a peripheral hiding layer 27 (chrome ring), a ground edge, etc., depending on the end use. The rearview device 14 may include an electro-optic element 28 configured to dim, which includes an electro-optic medium disposed between two substrates. The rearview device 14 includes a housing 30, which is configured to support and protect the circuit board 12. The circuit board 12 extends within the housing 30 and may be electrically coupled with a vehicle within which the rearview device 14 is positioned. The connector assembly 10 may be used to electrically couple the circuit board 12 with the vehicle via the plurality of electrical leads 18 which form part of a wire harness 38.

As illustrated in FIG. 1A, one or more buttons 31 may be disposed about a periphery of the housing 30. As shown in FIG. 1A, the buttons 31 are disposed on a bottom portion of the housing 30. However, it will be understood that buttons 31 may be disposed on other portions of the housing or may be disposed in a portion of the bezel 26. The buttons 31 are operably coupled to and in electrical communication with the circuit board 12. The buttons 31 are configured to carry out predetermined functions of the rearview device 14. It will be understood that the buttons 31 may be programmable or may have predefined factory settings. The wire harness 38 includes an external connector 33 configured to couple with a complementary connector extending from the vehicle. The complementary connector may extend from the headliner, a portion of the glass, or a portion of the dash, although other configurations are also contemplated.

Figure 1B:
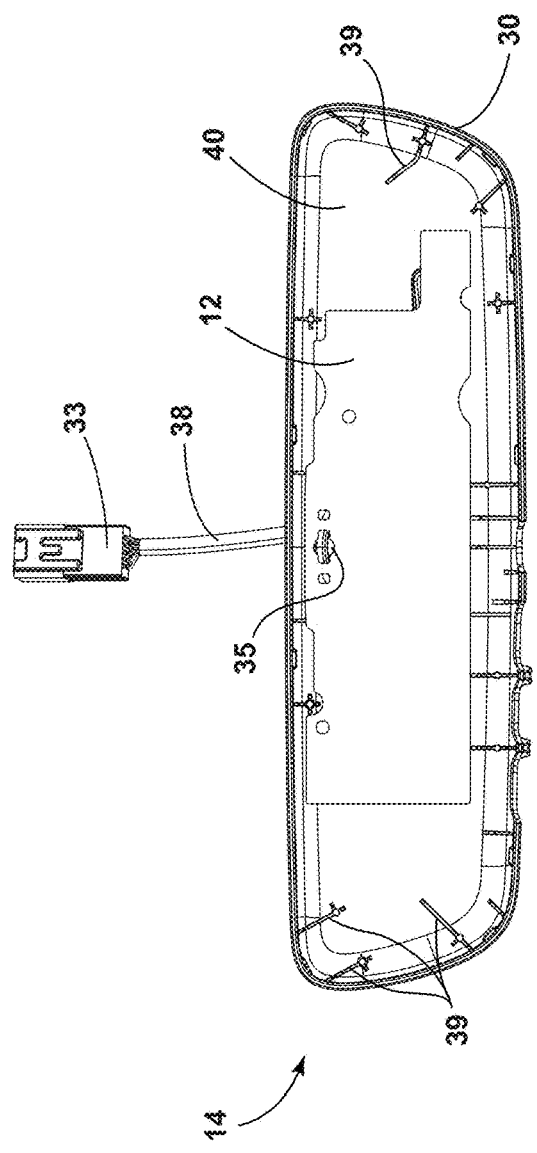
FIG. 1B is a front elevational view of a mirror assembly of the present disclosure with internal components exposed.

Turning now to FIG. 1B, the circuit board 12 is disposed behind the electro-optic element 28. The circuit board 12 may include a glare sensor aperture 35 configured to receive a glare sensor therein. The glare sensor is generally configured to detect glare from a vehicle located behind the vehicle in which the rearview device 14 is disposed within. Upon detection of glare, the rearview device 14 may be configured to activate the electro-optic medium disposed in the electro-optic element 28, thereby darkening the electro-optic element 28 to minimize glare that is visible by a driver viewing the rearview device 14. Notably, an inner portion of the housing 30 also includes a plurality of inwardly extending support flanges 39.

Figure 2:
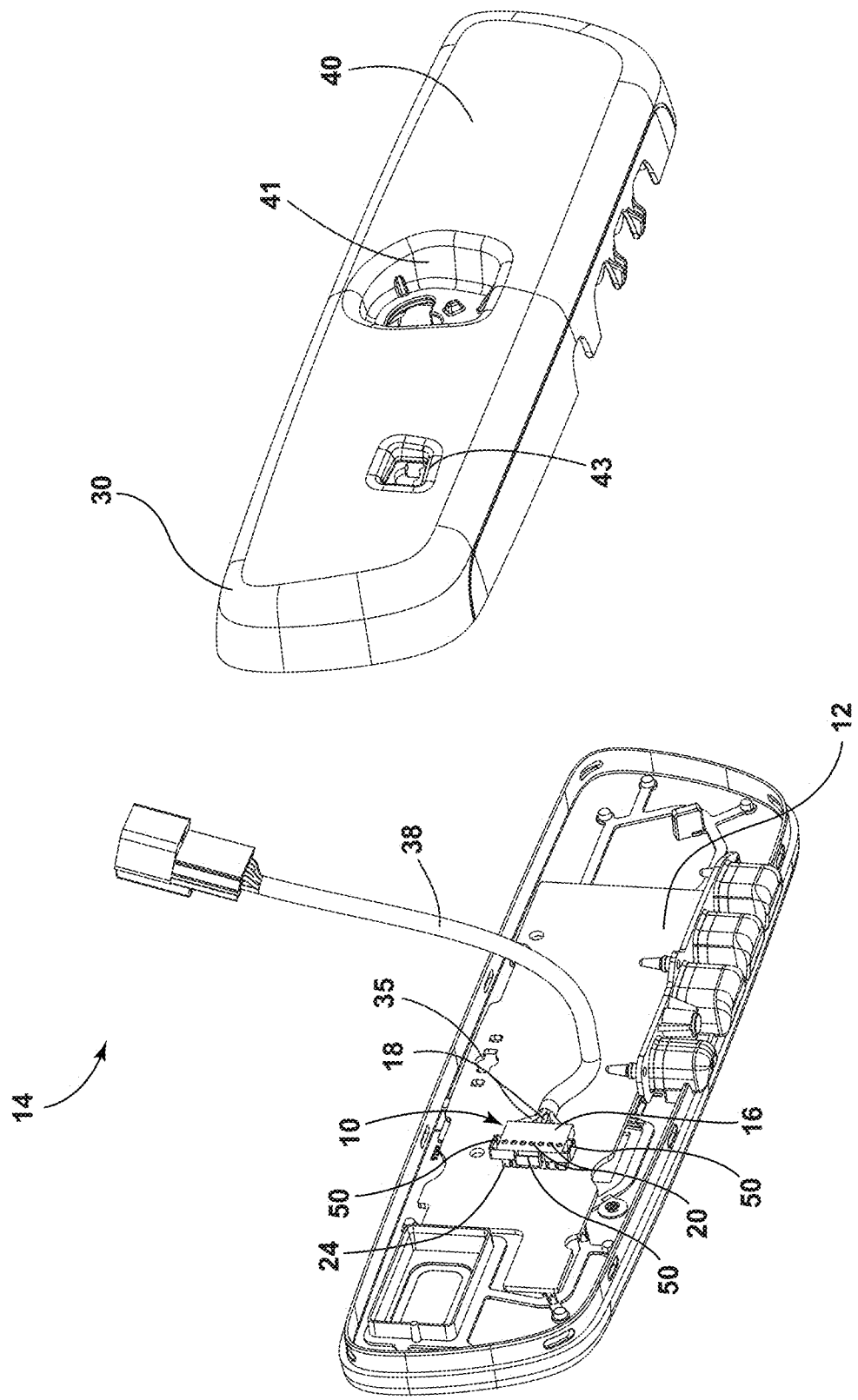
FIG. 2 is a front perspective view of a circuit board and electro-optic element separated from a housing of a rearview device assembly.

With reference now to FIG. 2, the housing 30 includes a recess 41 disposed on a rear portion of the housing. The recess is configured to receive a mount that couples the rearview device 14 to an interior portion of the vehicle. The housing 30 also includes an ambient light sensor aperture 43. The ambient light sensor aperture 43 allows optical communication of an ambient light sensor to a forward portion of the vehicle. The ambient light sensor is configured to detect ambient light levels which aid in the functional use of the rearview device 14, and specifically the functionality of the electro-optic element 28. Notably, due to the low-profile connector assembly 10, the depth of the housing 30 may be minimized, thereby creating more room on the inside of the vehicle. Stated differently, the overall depth of the rearview device 14 is minimized to create a better packaging of the rearview device 14, thereby minimizing bulk inside the vehicle cabin as well as weight that can result in sag, or droop, of the rearview device 14 over time. Traditional assemblies with larger connectors have deeper housings which can be bulky and may consume more interior cabin space of the vehicle.

Figure 3:
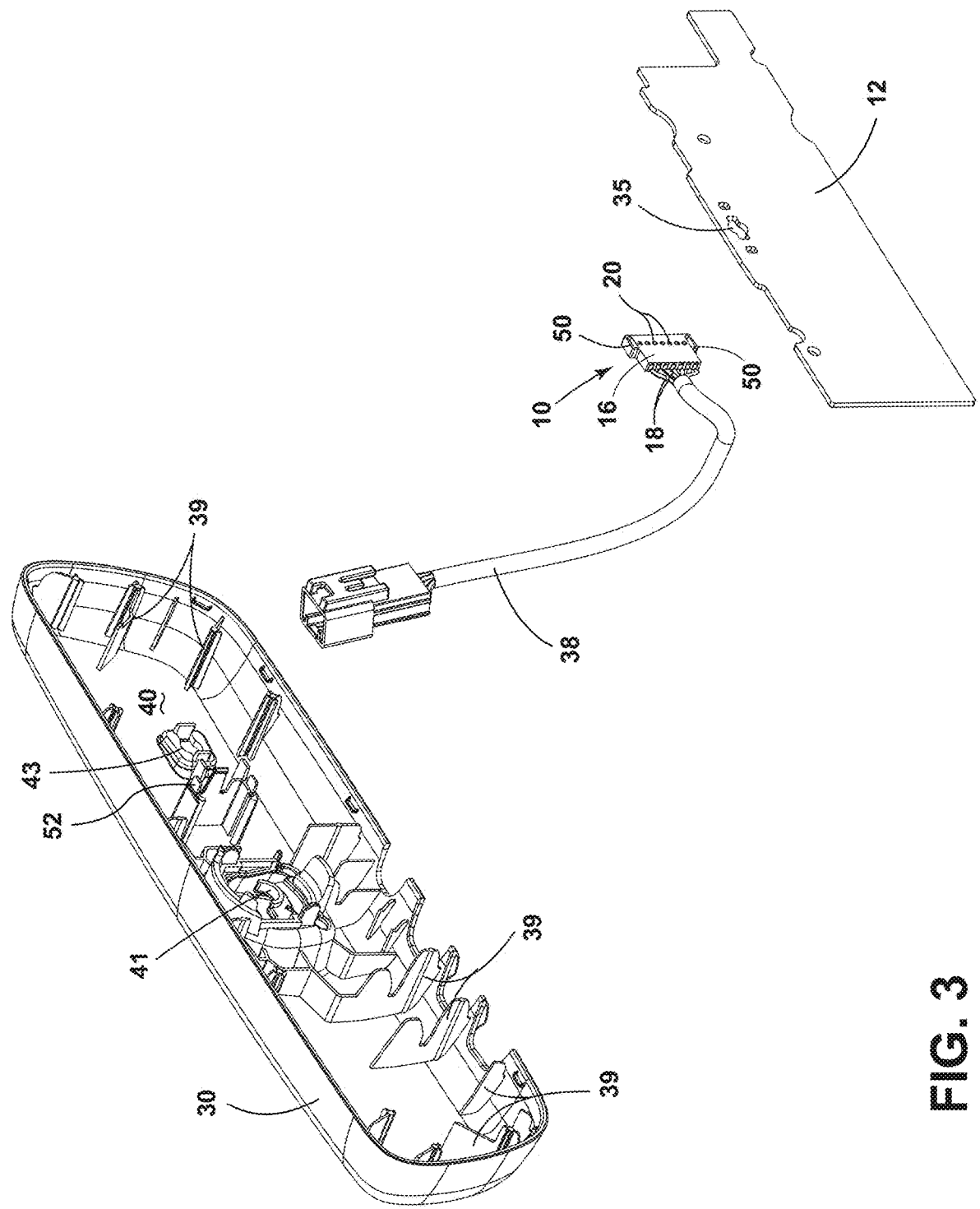
FIG. 3 is an exploded rear perspective view of a portion of a rearview device illustrating a connector assembly, circuit board and housing.
Figure 4:
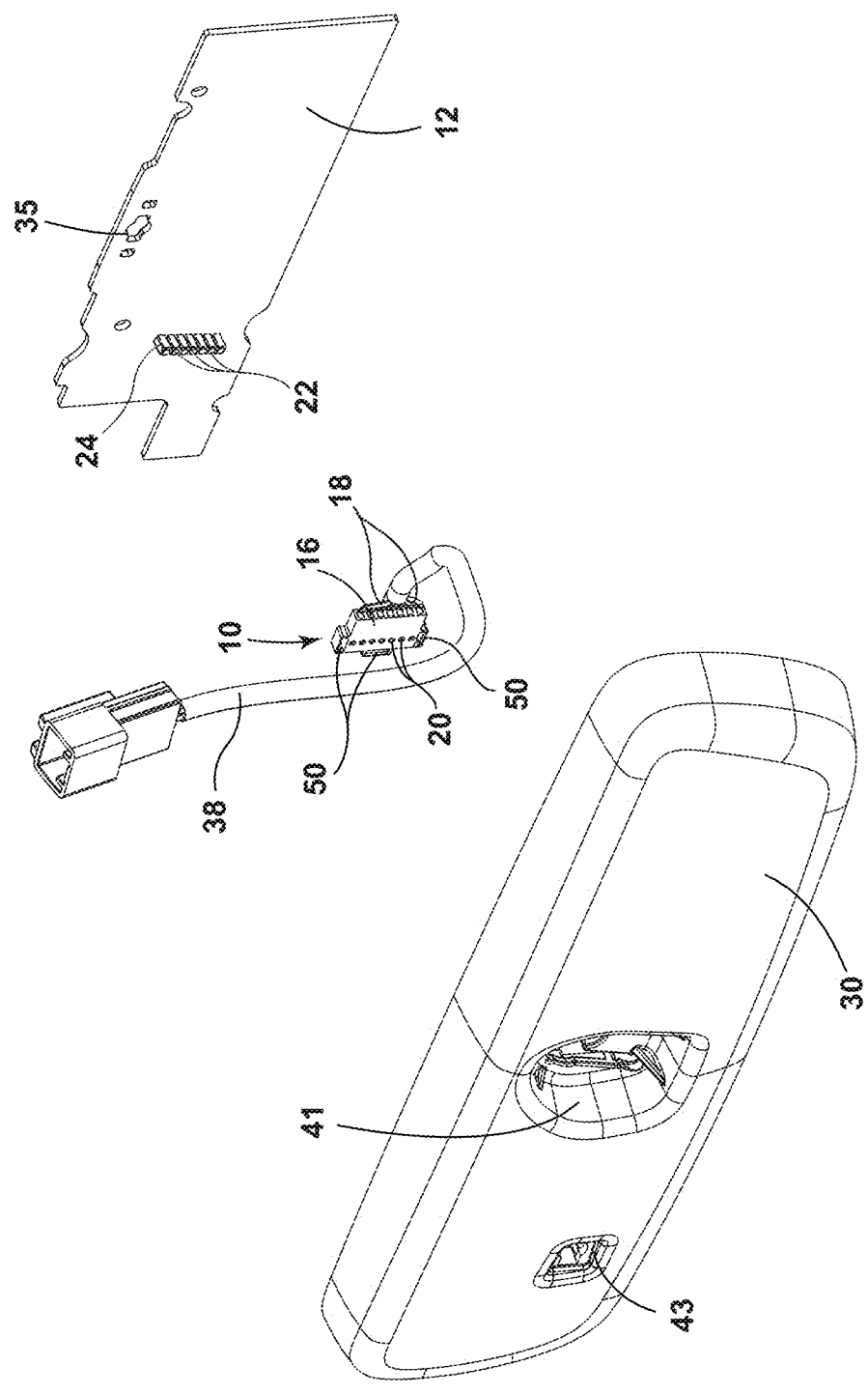
FIG. 4 is an exploded front perspective view of a portion of a rearview device illustrating a connector assembly, circuit board and housing.

With reference now to FIGS. 3 and 4, the connector assembly 10 is disposed between the circuit board 12 and a rear wall 40 of the housing 30. A recess 41 may be disposed in the rear wall 40 for receiving a mount that secures the rearview device 14 to an interior of the vehicle. The connector assembly 10 includes a very low profile such that the circuit board 12 can be tightly placed against the rear wall 40 of the housing 30. The plurality of columns 24 may be permanently or removably coupled with the circuit board 12 and include the spring-biased contacts 22 that maintain contact with the circuit board 12. In one embodiment, the spring-biased contacts 22 are in the form of PRECI-DIP 7 position spring contact assembly, however, the PRECI-DIP 7 position spring contact assembly is exemplary only and not meant to be limiting. In the illustrations of FIGS. 3 and 4, the columns 24 of the spring-biased contacts 22 of the PRECI-DIP 7 position spring contact assembly extend away from the circuit board 12 in a generally orthogonal direction. However, the spring-biased contacts 22 could extend at any angle relative to the circuit board 12. The spring-biased contacts 22 are configured to be received in the contact-receiving apertures 20 of the body 16 of the connector assembly 10. As shown in FIGS. 9-12, terminals 42 that convey power and/or data are located within the body 16 of the connector assembly 10. The terminals 42 transfer data and/or power from the plurality of electrical leads 18 to the spring-biased contacts 22 of the columns 24. The data and/or power is then transferred to the circuit board 12. There are the same number of contact-receiving apertures 20 as there are columns 24 that support the spring-biased contacts 22.

Similarly, there is the same number of electrical leads 18 as there are contact-receiving apertures 20. The contact-receiving apertures 20 may extend completely through the body 16 of the connector assembly 10 or may only extend into one side of the body 16 so that the spring-biased contacts 22 can engage and be inserted into the body 16 of the connector assembly 10.

Figure 5:
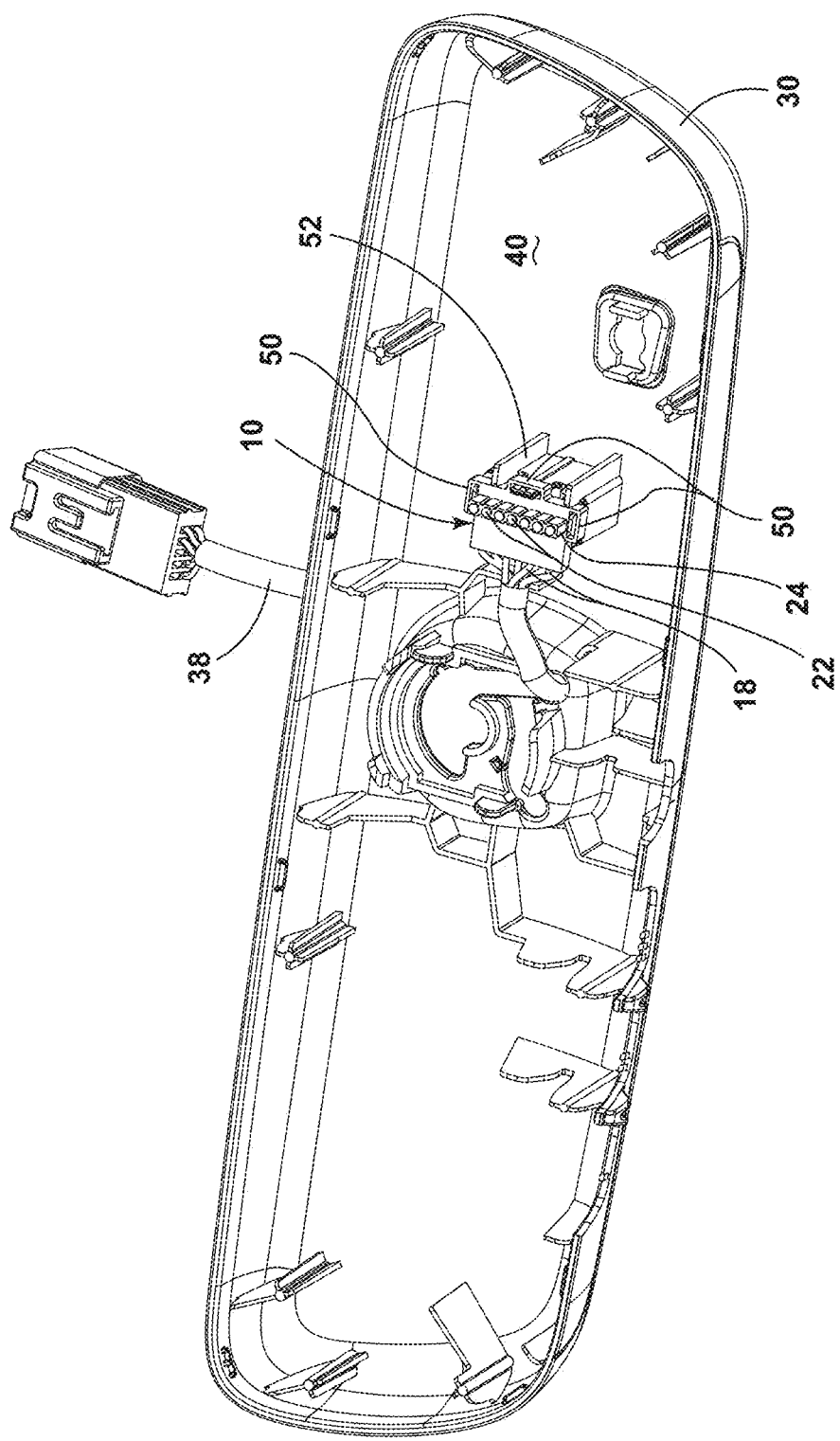
FIG. 5 is an enlarged front perspective view of a connector assembly and circuit board within a housing of the present disclosure.
Figure 6:
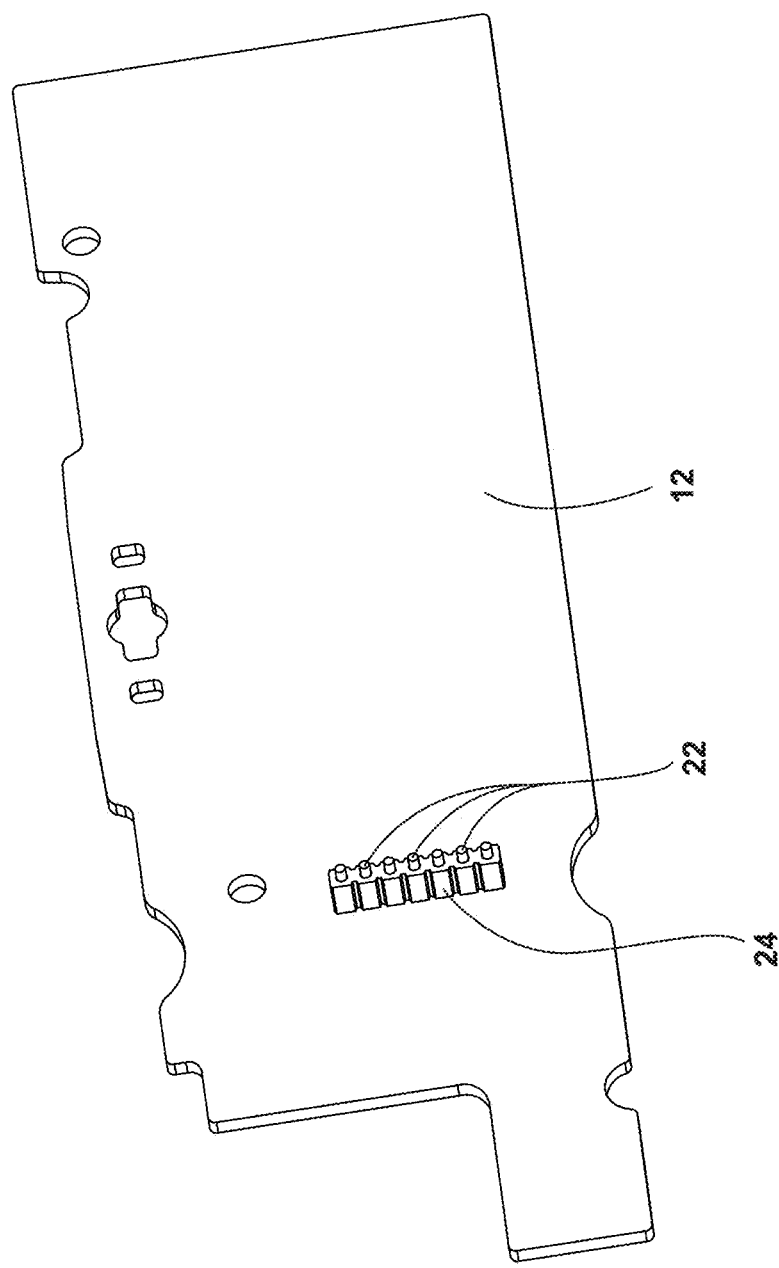
FIG. 6 is a front perspective view of a circuit board of FIG. 7.

With reference to FIGS. 5 and 6, the general orientation of the connector assembly 10 is illustrated, in FIG. 5, the connector assembly 10 and columns 24 are illustrated separated from the circuit board 12. The connector assembly 10 will be generally positioned on a support structure 52. The support structure 52 is configured to engage fastener apertures 50. By securing the support structure 52 with the fastener apertures 50, the connector assembly 10 is prevented from substantial movement within the housing 30, thereby minimizing buzz, squeak, and rattle concerns. The connector assembly 10 is positioned such that a planar extent of the body 16 is parallel with a planar extent of the circuit board 12. In this instance, the plurality of columns 24 extend orthogonally between the planar extent of the body 16 and the planar extent of the circuit board 12. However, in the illustrated embodiment, the electrical leads 18 extend parallel with the circuit board 12. It will be understood that this arrangement can vary and that the connector assembly 10 could be oriented differently.

Figure 7:
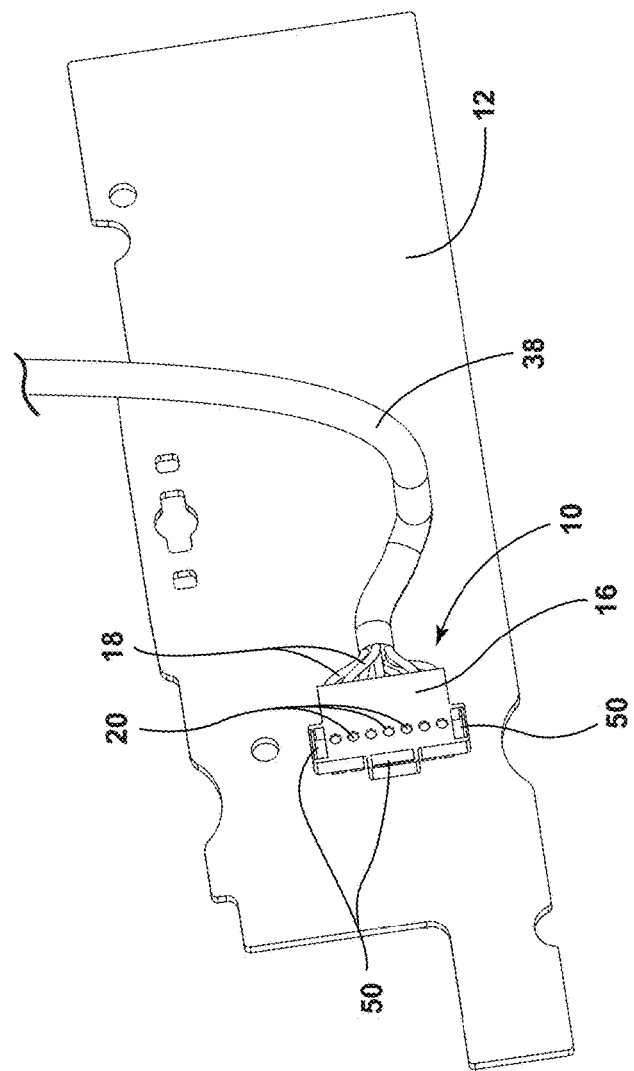
FIG. 7 is a side perspective view of a connector assembly and a circuit board.
Figure 8:
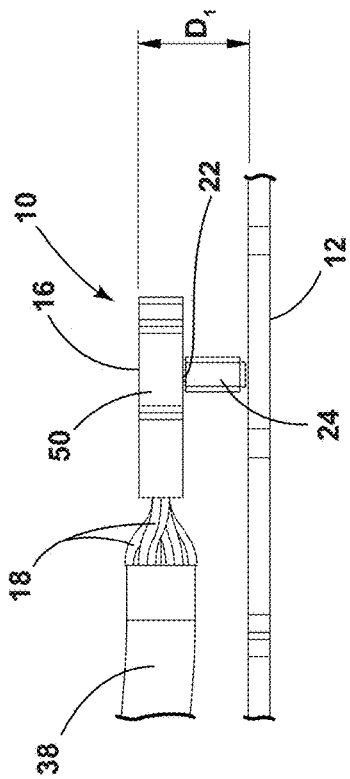
FIG. 8 is a side elevational view of a connector assembly and a portion of a circuit board.
Figure 10:
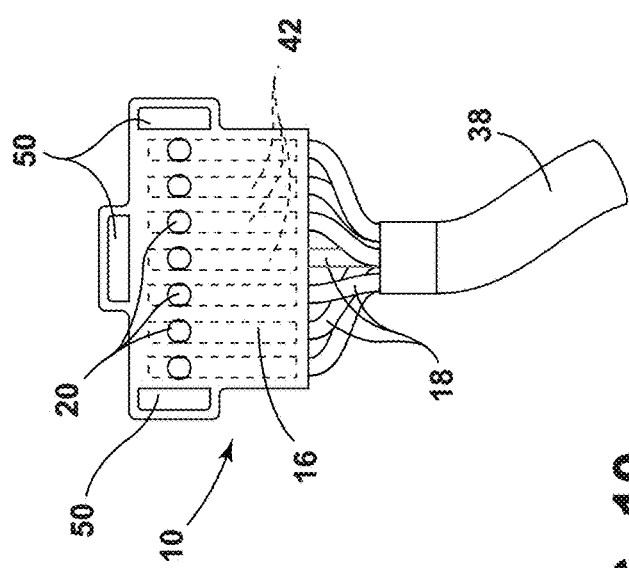
FIG. 10 is a top plan view of the connector assembly of FIG. 9.
Figure 12:
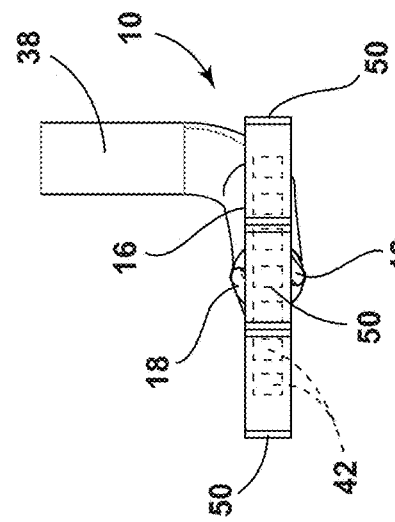
FIG. 12 is a side elevational view of the connector assembly of FIG. 9.
Figure 9:
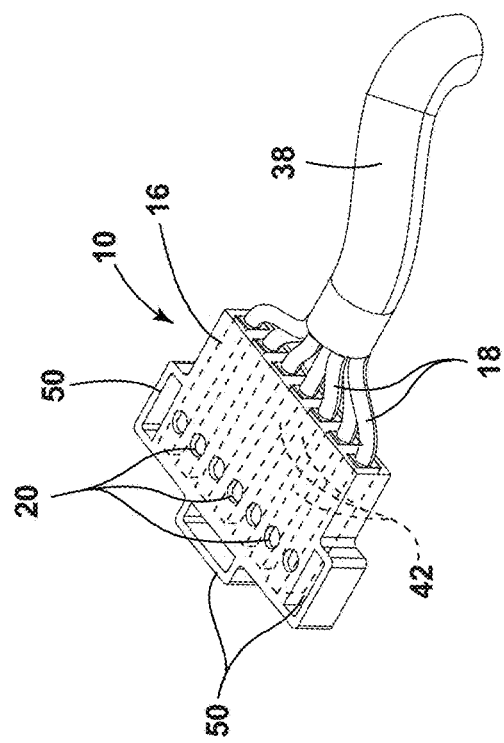
FIG. 9 is a top perspective view of a connector assembly of the present disclosure.
Figure 11:
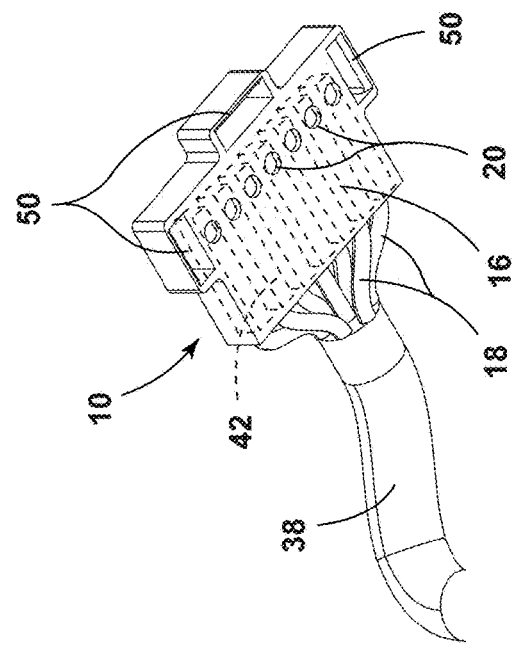
FIG. 11 is a bottom perspective view of the connector assembly of FIG. 9.

With reference to FIGS. 6-8, the circuit board 12 may be coupled with the columns 24 and in electrical communication therewith. The contact-receiving apertures 20 of the connector assembly 10 may be frictionally engaged with the spring-biased contacts 22 (FIG. 7). Notably, a distance $D_1$, as shown in FIG. 8, is a shortened distance, which cannot be achieved by traditional connectors. Accordingly, this connector assembly 10 provides a very sleek and low-profile design such that the housing 30 can be made slimmer and more components can be provided within the housing 30 due to the minimal space the connector assembly 10 requires. In some instances, the spring pin contact method allows for the electrical connection to be made between the circuit board 12 and the connector assembly 10 when the housing 30 and front bezel 26 are assembled (the wire harness does not need to be plugged into the housing manually).

With reference now to FIGS. 9-12, as previously noted, the connector assembly 10 may include the plurality of fastener apertures 50 that extend on each of three sides of the connector assembly 10. The fastener apertures 50 are used to snap in place the connector assembly 10 or other features to the support structure 52 coupled with the rear wall 40 of the housing 30 when in use (FIG. 5). The connector assembly 10 includes a generally flat body that provides a low-profile, lightweight solution as compared to traditional designs.

Figure 13:
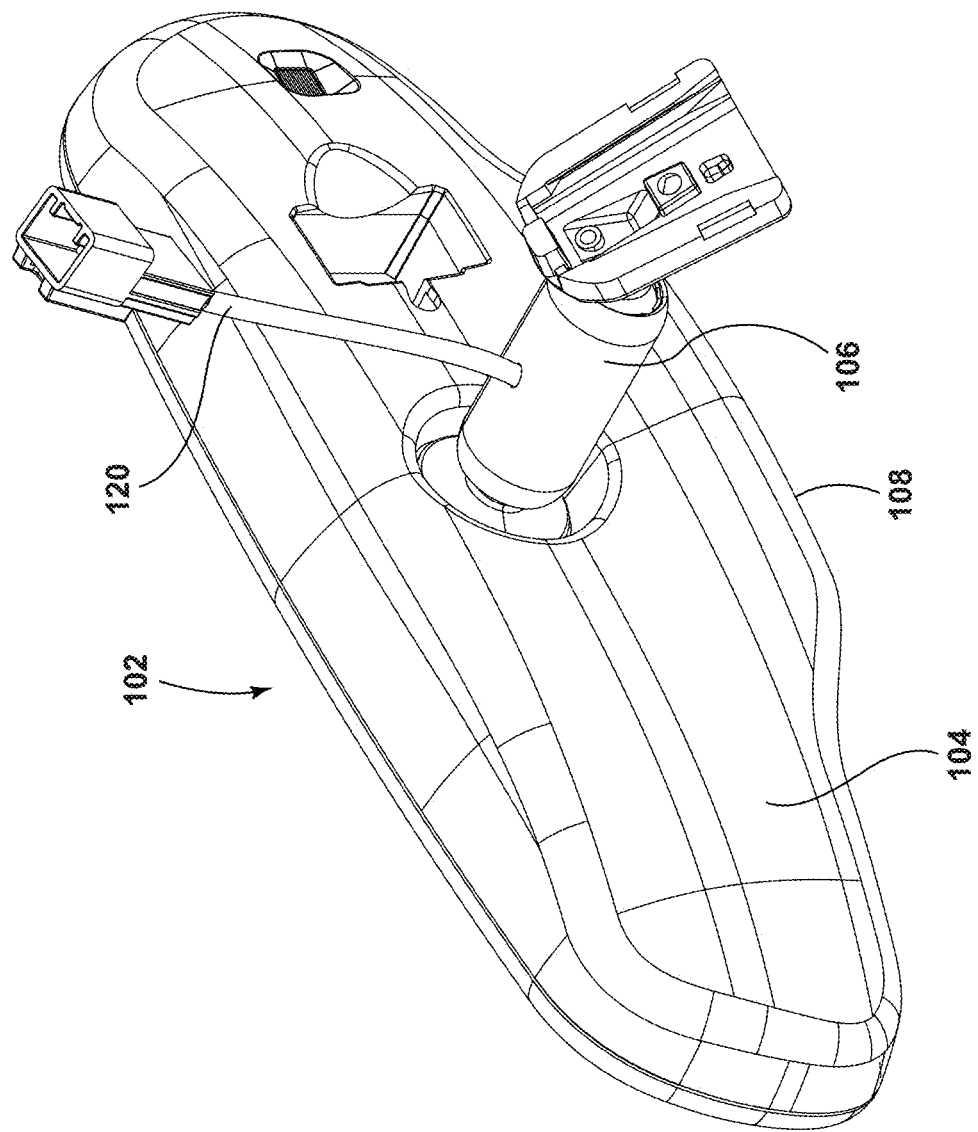
FIG. 13 is a rear perspective view of a rearview device illustrating a connector assembly and housing of the present disclosure.
Figure 14:
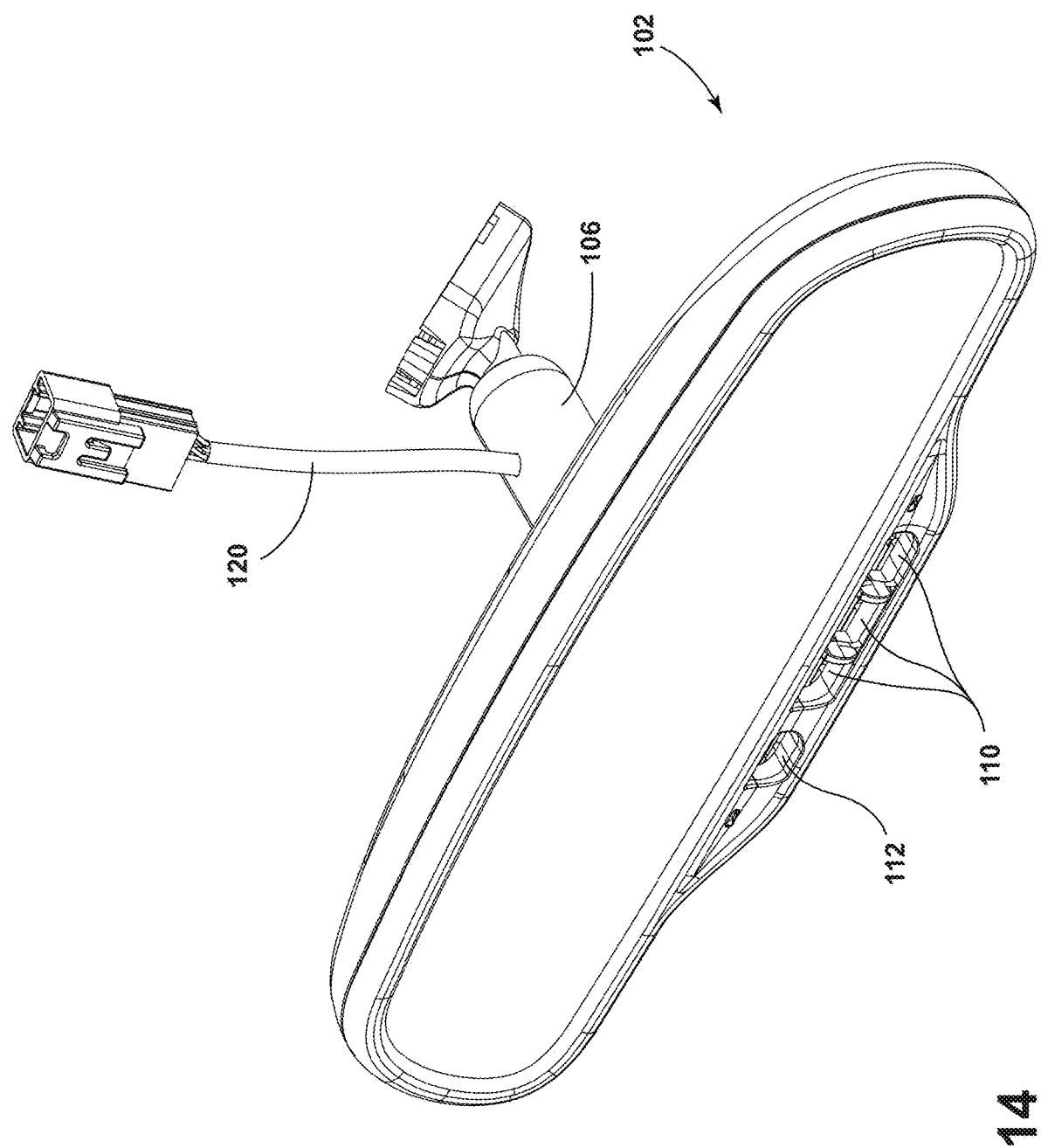
FIG. 14 is a front perspective view of a rearview device illustrating a connector assembly and housing of the present disclosure.
Figure 15:
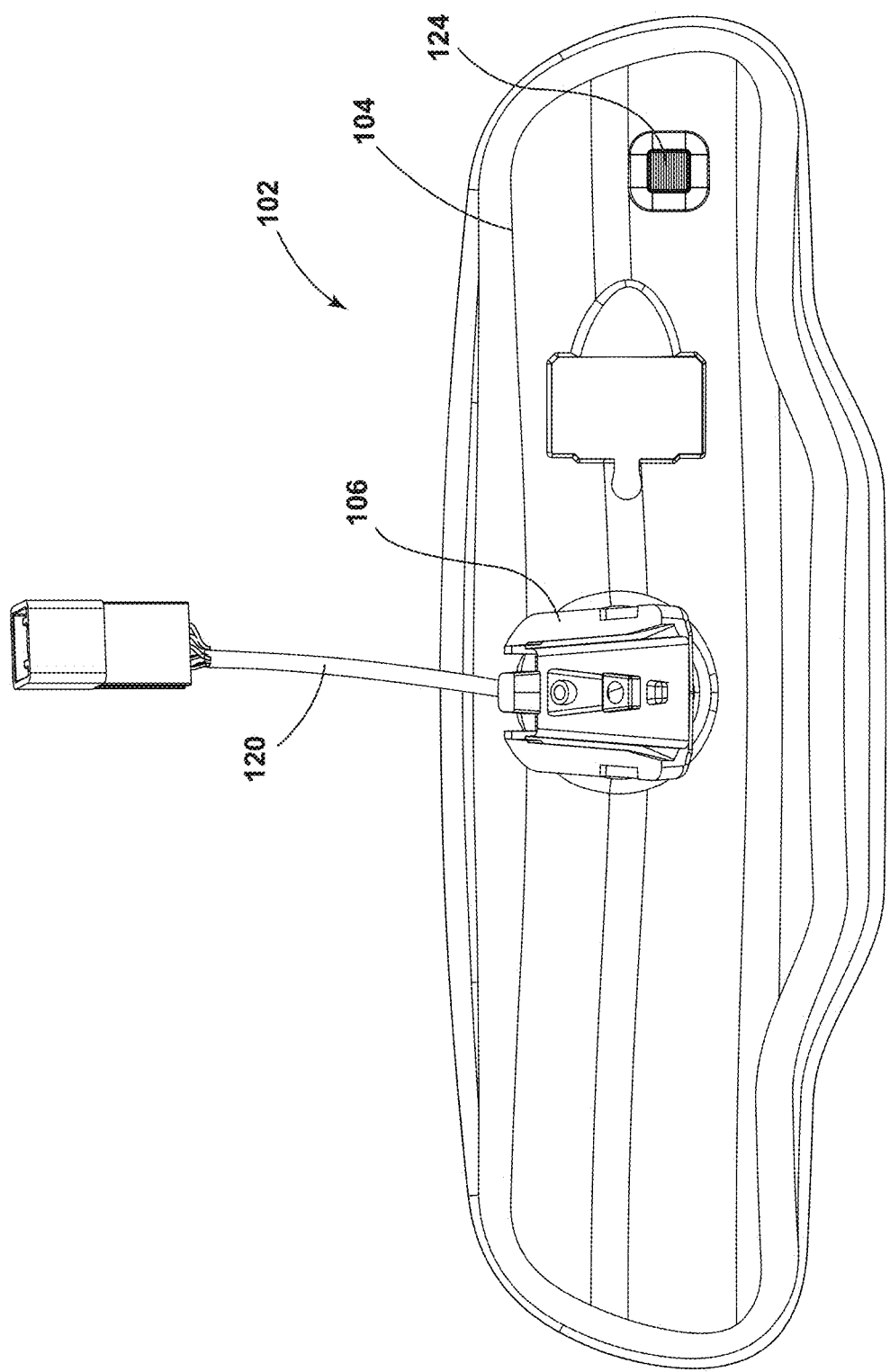
FIG. 15 is a rear elevational view of the rearview device of FIG. 13.

With reference now to FIG. 13, in another rearview device 102 of the present disclosure, a connector assembly 100 (FIG. 16) is utilized to provide electrical communication from a vehicle to the rearview device 102. The rearview device 102 includes a housing 104 that is operably coupled with a mount 106 that extends from the housing 104. The mount 106 may be operably coupled with a windscreen, dash, headliner, etc. of a vehicle. The rearview device 102 includes many of the same features as set forth in the rearview device 14 of FIGS. 1A-4, and it will be understood that either connector assembly 10 or connector assembly 100 could be used with either rearview device 14 or rearview device 102. That said, the rearview device 102 also includes some different features. For example, as shown in FIG. 14, the housing 104 is operably coupled with a bezel 107. Both the housing 104 and the bezel 107 include a chin 108. The chin 108 defines a plurality of button mounting apertures 110. The button mounting apertures 110 receive buttons that activate various functions of the rearview device 102. The chin 108 may also define a glare sensor aperture 112 configured to provide optical communication of a rearward view of the vehicle to a glare sensor lens.

Figure 16:
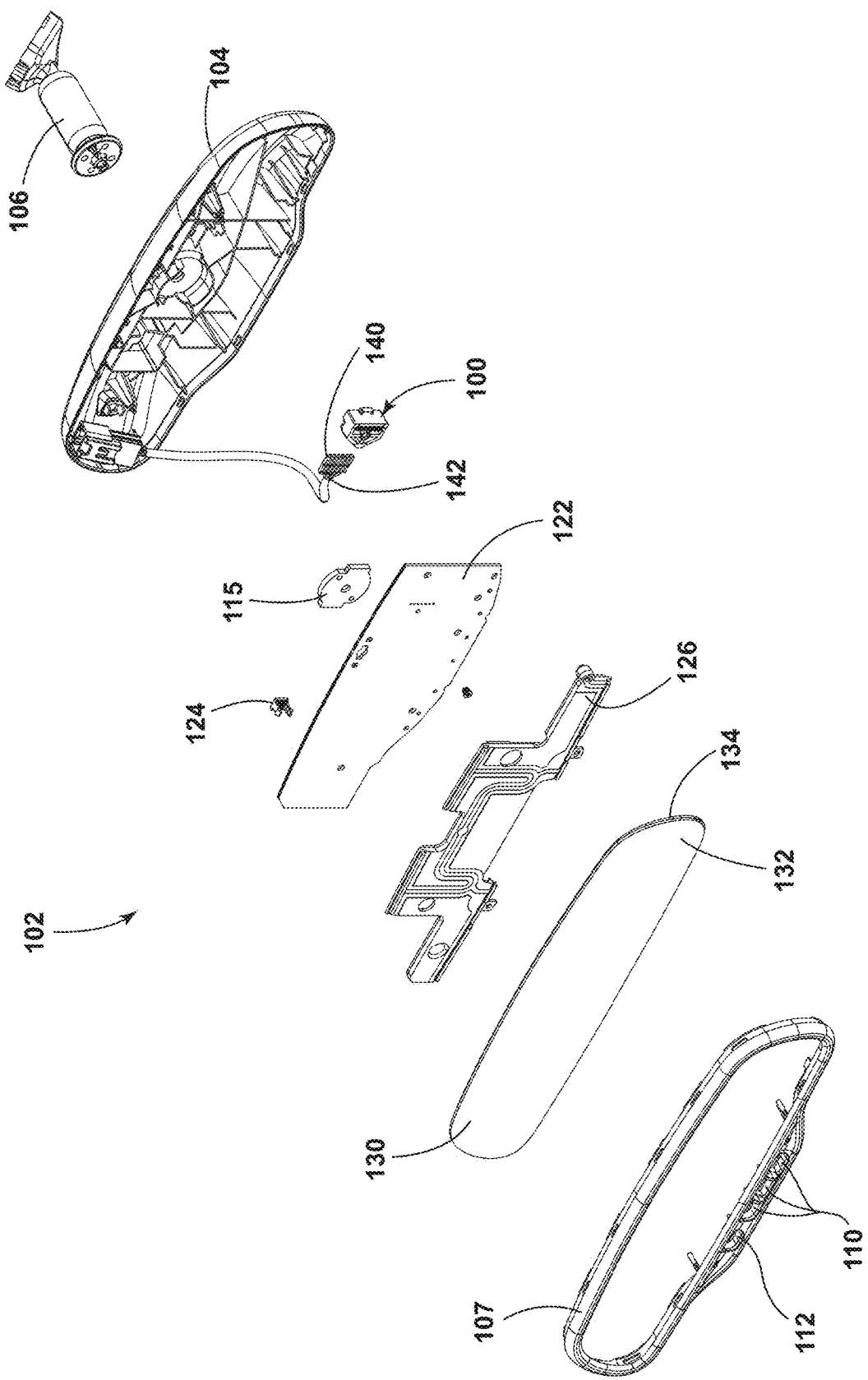
FIG. 16 is a front exploded perspective view of the rearview device of FIG. 13.
Figure 17:
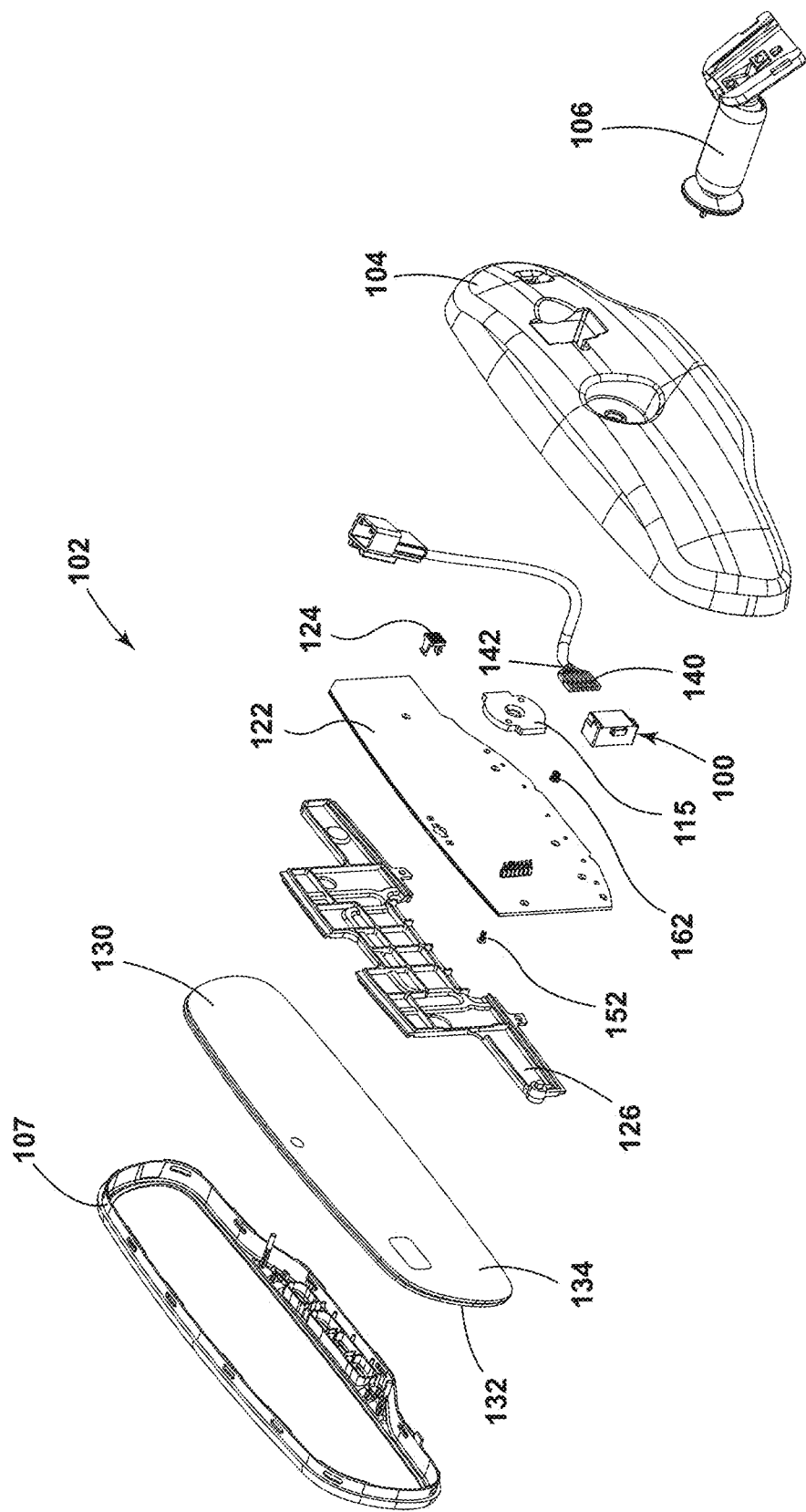
FIG. 17 is a rear exploded perspective view of the rearview device of FIG. 13.
Figure 18:
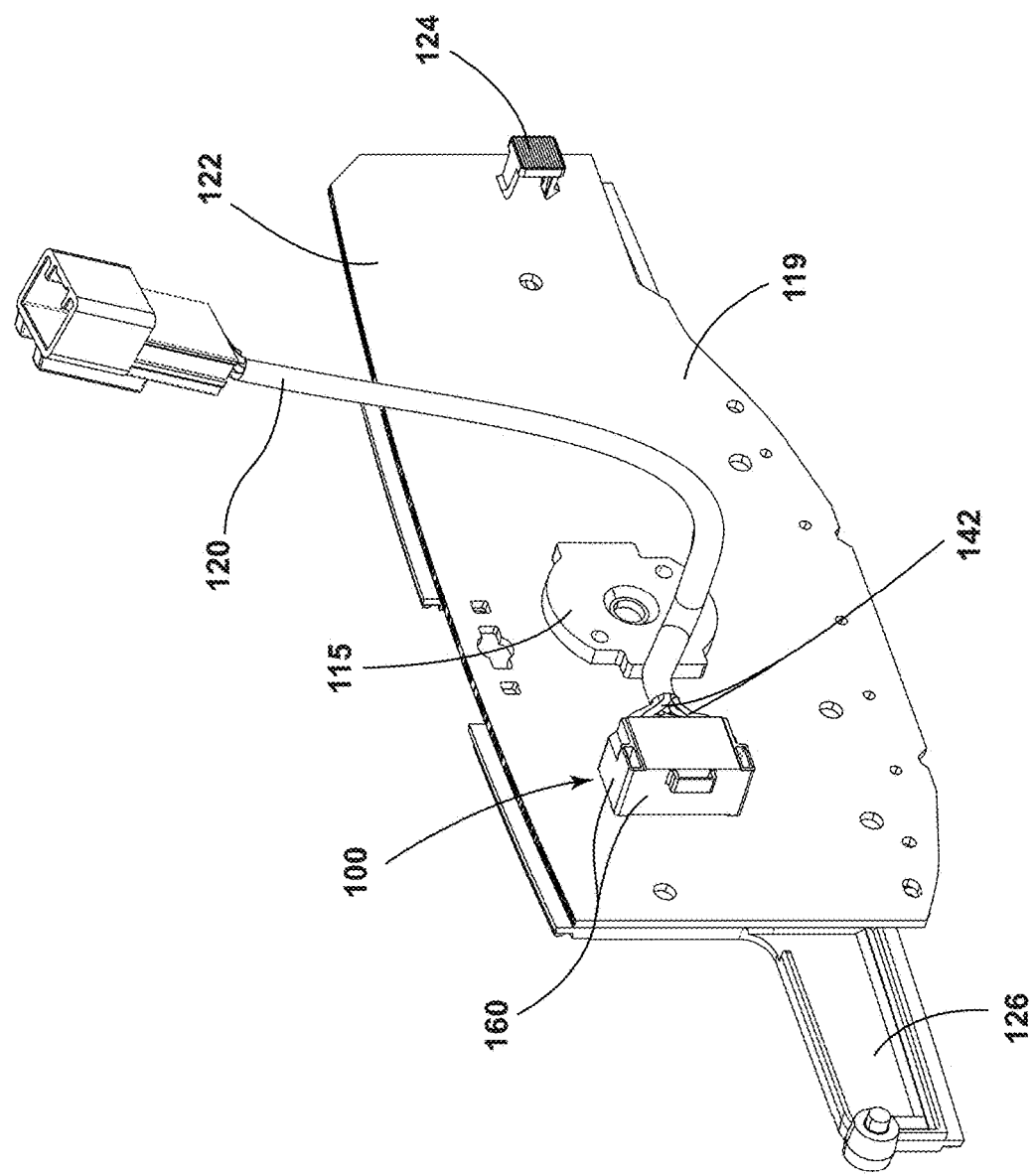
FIG. 18 is a side perspective view of a connector assembly and a circuit board of the present disclosure.

With reference now to FIGS. 16, 17 and 18, the mount 106 of the rearview device 102 may be operably coupled with or extend into the housing 104. A securing bracket 115 may operably couple the mount 106 with the housing 104. A wire harness 120 extends through the housing 104 and is configured to operably couple with an engagement surface 119 of a circuit board 122 via the connector assembly 100. The circuit board 122 may be in electrical communication with an ambient light sensor 124 as well as the glare sensor lens that is optically coupled with a glare sensor. A carrier plate 126 extends between the circuit board 122 and an electro-optic element 130. The electro-optic element 130 may be an electrochromic device that includes first and second substrates 132, 134 with an electro-optic medium, such as an electrochromic material, disposed therebetween. The bezel 107 extends over the electro-optic element 130 and operably couples the electro-optic element 130 with the housing 104. It will be understood that variations to this construction are also possible.

Figure 19:
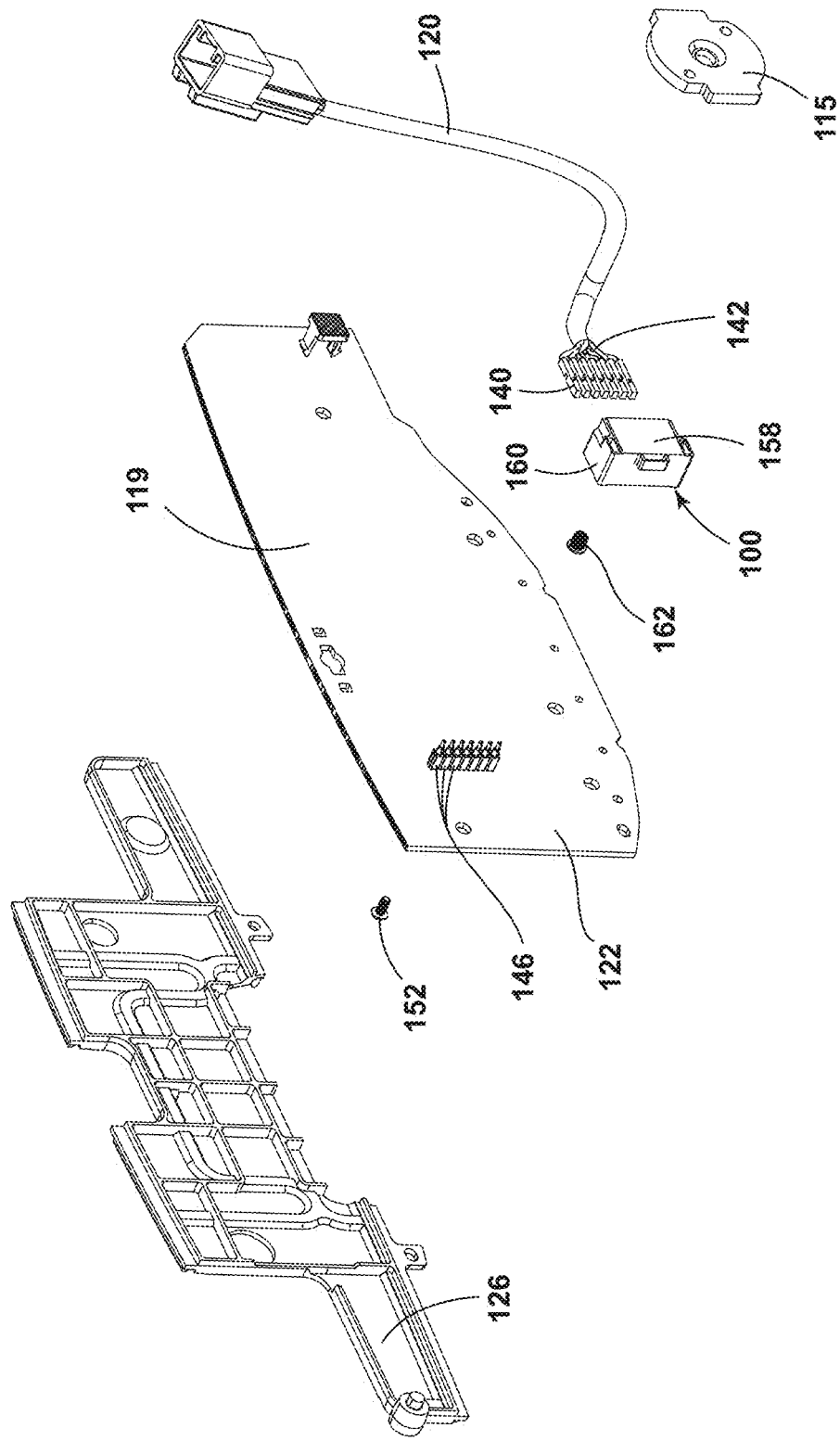
FIG. 19 is a side exploded perspective view of a connector assembly and circuit board within a housing of the present disclosure.
Figure 20:
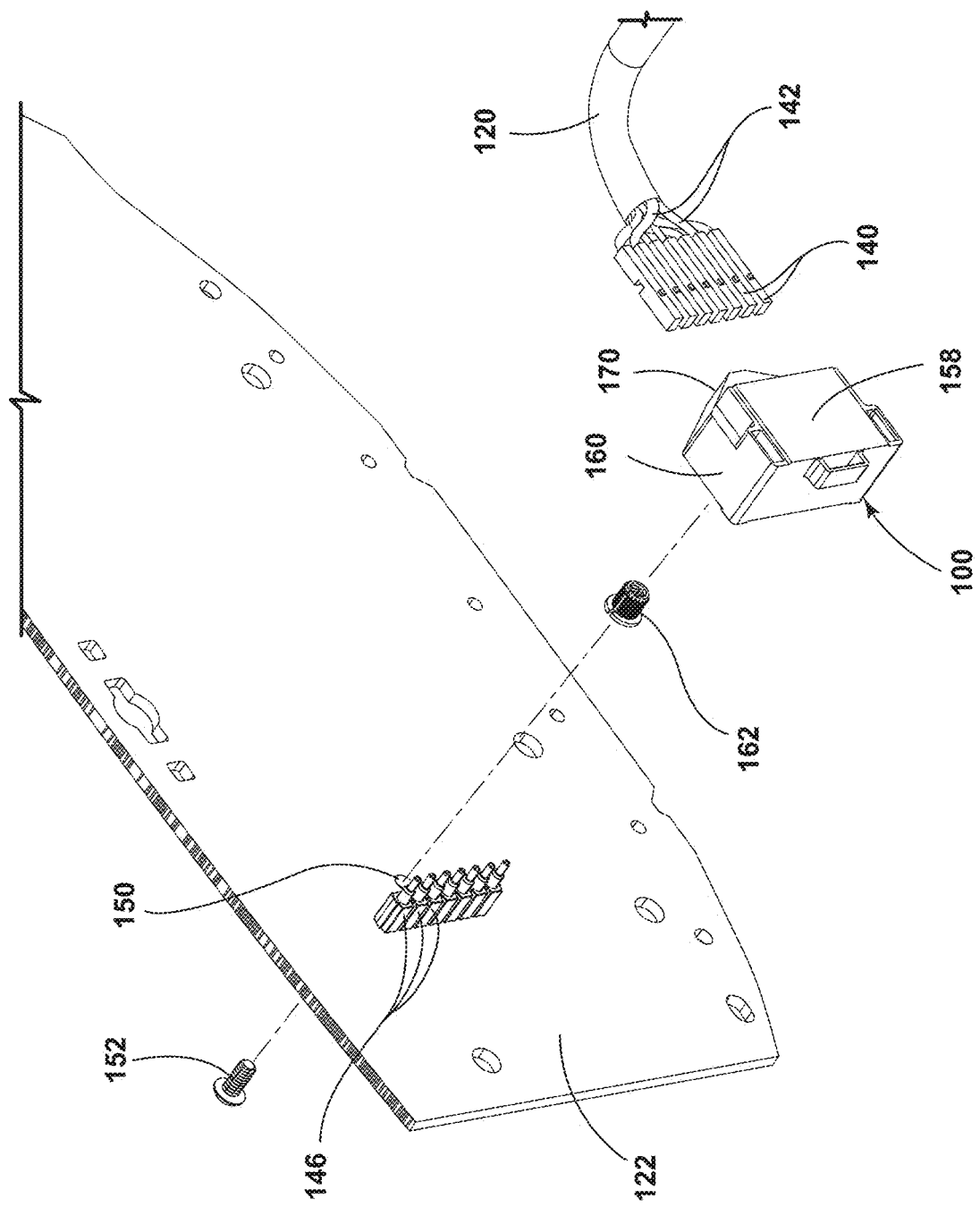
FIG. 20 is an enlarged side exploded perspective view of the connector assembly and circuit board of FIG. 19.

With reference now to FIGS. 18-20, the connector assembly 100 is configured to engage with a plurality of terminals 140 disposed at the end of wire or electrical leads 142 of the wire harness 120. Electrical leads 142 are received in the terminals 140 within the body. The terminals 140 are disposed proximate a plurality of contact-receiving apertures 145. The terminals 140 are inserted into the connector assembly 100, which includes a plurality of openings 144 (FIG. 21) configured to receive the plurality of terminals 140. The terminals 40 are proximate contact-receiving apertures 145. The contact-receiving apertures 145 may extend completely through the body. In addition, the terminals 140 may be arranged side by side in a linear arrangement (FIG. 22). The circuit board 122 includes a generally planar construction. However, the printer circuit board 122 can take on other constructions as well. Columns 146 that include spring-biased contacts 148 are fixed to or removably coupled with the circuit board 122. A fastener aperture 150 is disposed proximate the columns 146 and is configured to receive a mechanical fastener 152, which is an inserting fastener as illustrated, that couples the connector assembly 100 to the circuit board 122.

With reference now to FIGS. 21-24, a body 159 of the connector assembly 100 includes another surface 158 that is generally planar. The connector assembly 100 also includes elongated external peripheral walls 160 that project downwardly, thereby shrouding the columns 146 and spring-biased contacts 148 that are electrically coupled with the circuit board 122. The peripheral walls 160 include feet 161 that extend below a planar bottom surface of the walls. Internal walls 163 of the connector assembly 100 define the fastener aperture 150 for securing the mechanical fastener 152 that is used in conjunction with a complementary mechanical fastener 162, which, as illustrated, is a receiving fastener, that secures the connector assembly 100 to the circuit board 122. When the connector assembly 100 is positioned and securely fastened with the circuit board 122, the spring-biased contacts 148 and columns 146 are in electrical communication with the terminals 140. Specifically, once the connector assembly 100 has been fully secured, the terminals 140 that are operably coupled with and have received the electrical leads 142 of the wire harness 120 provide abutting contact or proximate contact with the spring-biased contacts 148, thereby powering the circuit board 122. The elongated peripheral walls 160 of the connector assembly 100 provide additional support to the terminals 140 and columns 24, thereby assisting in maintaining contact between the terminals 140 and the electrical leads 142 as well as between the terminals 140 and the spring-biased contacts 148. In addition, the mechanical fastener arrangement secures the connector assembly 100 with the circuit board 122 thereby minimizing the likelihood of the loss of electrical connection between the terminals 140 and spring-biased contacts 148 due to relative movement between components. The low-profile connection of this construction is similar to the previous embodiment for connector assembly 10, but includes the elongated peripheral walls 160 that shroud, or otherwise conceal, the columns 24. A base 170 extends from the body 159 and supports the electrical leads 142.

Figure 25:
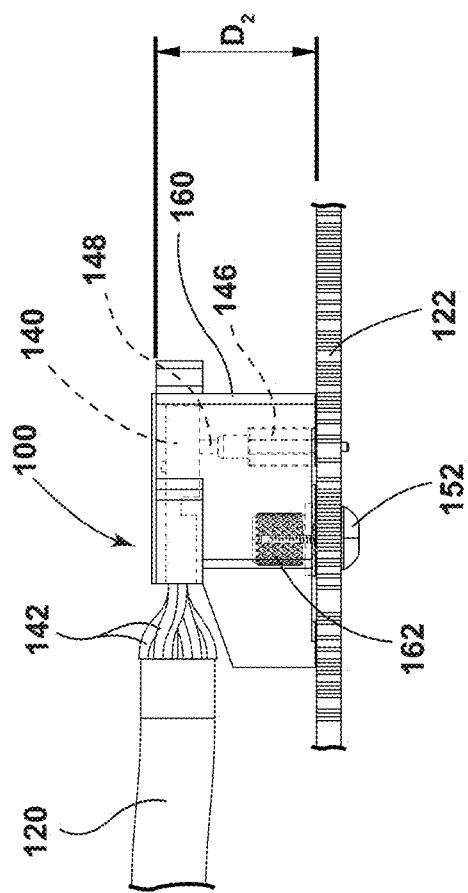
FIG. 25 is a side elevational view of a connector assembly coupled with a portion of a circuit board of the present disclosure.

With reference now to FIG. 25, the height $D_2$, which is the spacing from an outer surface of the connector assembly 100 to an engagement surface 119 of the circuit board 122 is approximately equal to $D_1$ of the connector assembly 10. However, the receiving fastener 162 and the columns 146 are concealed and protected by the peripheral walls 160 and internal walls 163. As previously noted, the base 170 extends under the electrical leads 142 and supports the same.

These connectors provide a low-profile solution that minimizes the total volume of space needed for a connector inside a housing. As a result, additional space is provided for other components or to minimize the size of the housing thereby reducing overall mirror size, mass and allowing more options to approve the aesthetics of the mirror housing.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A rearview device comprising:
   a connector assembly comprising:
      a body including a plurality of electrical leads extending therefrom and removably coupled therewith;
      a plurality of contact-receiving apertures extending through the body and receiving a plurality of spring contacts on a circuit board, the plurality of spring contacts abutting and being compressed between the circuit board and the body, the plurality of spring contacts directly engaging the plurality of electrical leads when inserted into the plurality of contact-receiving apertures; and
      a plurality of peripheral walls that are adjacent the circuit board.

2. The rearview device of claim 1, wherein the connector assembly further includes peripheral fastener apertures disposed on at least two sides of the connector assembly.

3. The rearview device of claim 1, further comprising:
   a plurality of internal walls that extend within the connector assembly.

4. The rearview device of claim 1, wherein the plurality of peripheral walls abut the circuit board.

5. The rearview device of claim 1, wherein the plurality of peripheral walls include feet that extend below a planar bottom surface of the plurality of peripheral walls.

6. The rearview device of claim 1, further comprising:
   a two-part mechanical fastener configured to secure the connector assembly to the circuit board.

7. The rearview device of claim 1,
   wherein the plurality of electrical leads are received in terminals within the body, the terminals disposed proximate the plurality of contact-receiving apertures.

8. The rearview device of claim 1, wherein the plurality of contact-receiving apertures extend completely through the body.

9. The rearview device of claim 7, wherein the terminals are arranged side by side in a linear arrangement.

10. A rearview device comprising:
a housing including a support structure operably coupled to a rear wall of the housing; and
a connector assembly comprising:
  a body engaged with the support structure including a plurality of electrical leads extending therefrom;
  a plurality of contact-receiving apertures extending through the body and receiving a plurality of spring contacts on a circuit board, the plurality of spring contacts directly engaging the plurality of electrical leads and extending orthogonally between a planar extent of the body and a planar extent of the circuit board; and
  a plurality of peripheral walls extending from the body and disposed between the body and the circuit board.

11. The rearview device of claim 10, wherein the connector assembly further includes peripheral fastener apertures disposed on at least two sides of the connector assembly.

12. The rearview device of claim 10, further comprising:
  a plurality of internal walls that extend within the connector assembly.

13. The rearview device of claim 10, wherein the plurality of peripheral walls abut the circuit board.

14. The rearview device of claim 10, wherein the plurality of peripheral walls include feet that extend below a planar bottom surface of the plurality of peripheral walls.

15. The rearview device of claim 10, further comprising:
  a two-part mechanical fastener configured to secure the connector assembly to the circuit board.

16. The rearview device of claim 10,
  wherein the plurality of electrical leads are received in terminals within the body, the terminals disposed proximate the plurality of contact-receiving apertures.

17. The rearview device of claim 10, wherein the plurality of contact-receiving apertures extend completely through the body.

18. The rearview device of claim 16, wherein the terminals are arranged side by side in a linear arrangement.

* * * * *